(12) United States Patent
Prevoir et al.

(10) Patent No.: US 10,619,022 B2
(45) Date of Patent: Apr. 14, 2020

(54) SURFACE TREATMENTS FOR WEARABLE DEVICES

(71) Applicant: Bose Corporation, Framingham, MA (US)

(72) Inventors: Shawn Prevoir, Northborough, MA (US); Kai Gao, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 76 days.

(21) Appl. No.: 15/921,355

(22) Filed: Mar. 14, 2018

(65) Prior Publication Data

US 2019/0284358 A1  Sep. 19, 2019

(51) Int. Cl.
*C08J 7/14* (2006.01)
*C08J 7/12* (2006.01)
*C08G 61/08* (2006.01)
*H04R 1/10* (2006.01)
*H04R 25/00* (2006.01)

(52) U.S. Cl.
CPC .............. *C08J 7/123* (2013.01); *C08G 61/08* (2013.01); *C08J 7/12* (2013.01); *C08J 7/14* (2013.01); *H04R 1/1016* (2013.01); *H04R 1/1058* (2013.01); *C08G 2261/228* (2013.01); *C08G 2261/3324* (2013.01); *C08G 2261/418* (2013.01); *C08G 2261/72* (2013.01); *C08J 2325/06* (2013.01); *C08J 2325/08* (2013.01); *C08J 2325/10* (2013.01); *C08J 2345/00* (2013.01); *C08J 2347/00* (2013.01); *C08J 2353/02* (2013.01); *C08J 2365/00* (2013.01); *H04R 1/1083* (2013.01); *H04R 25/652* (2013.01); *H04R 25/654* (2013.01); *H04R 2460/17* (2013.01)

(58) Field of Classification Search
CPC ............. C08C 19/04; C08F 8/06; C08F 32/08
See application file for complete search history.

(56) References Cited

U.S. PATENT DOCUMENTS 3,843,617 A   10/1974  Orlov et al.
8,600,096 B2  12/2013  Lin

FOREIGN PATENT DOCUMENTS

EP   2975859       2/2019
JP   H06133804  *  5/1994
WO   2018106532    6/2018

OTHER PUBLICATIONS

Romero-Sanchez, International Journal of Adhesion & Adhesives, vol. 25, (2005), p. 358-370 (Year: 2005).*
Translation of JPH 06-133804 (1994) (Year: 1994).*
Vig, UV/Ozone Cleaning of Surfaces, J. Vac. Sci. Technol. A 3 (3), May/Jun. 1985, pp. 1027-1034.

(Continued)

*Primary Examiner* — Robert C Boyle
(74) *Attorney, Agent, or Firm* — Bond, Schoeneck & King, PLLC (57) ABSTRACT

A wearable device including a body made of an elastic material having a polymeric backbone where a portion of the polymeric backbone is unsaturated. The body has an outer surface that is oxidized on at least one part with at least one functional group where the at least one part of the outer surface is more oleophobic than the body.

20 Claims, 8 Drawing Sheets

PROVIDING A WEARABLE DEVICE HAVING A BODY MADE OF AN ELASTIC MATERIAL HAVING A POLYMERIC BACKBONE, WHEREIN AT LEAST A PORTION OF THE POLYMERIC BACKBONE IS UNSATURATED — 810

OXIDIZING AT LEAST A PORTION OF AN OUTER SURFACE OF THE BODY TO INCORPORATE A FUNCTIONAL GROUP ON THE POLYMERIC BACKBONE — 820

(56) References Cited

OTHER PUBLICATIONS

Romero-Sanchez M. D. et al: "Addition of ozone in the UV radiation treatment of a synthetic styrene-butadiene-styrene (SBS) rubber", International Journal of Adhesion and Ashesives, Elsevier, Amsterdam, NL, vol. 25, No. 4, Aug. 2005 (Aug. 2005), pp. 358-370, XP027768568, ISSN: 0143-7496.

Deborah H. Carey et al: "Synthesis and Characterization of Surface-Functionalized 1,2-Polybutadiene Bearing-Hydroxyl or Carboxylic Acid Groups", Macromolecules, vol. 27, No. 25, Dec. 1994 (Dec. 1994), pp. 7254-7266, XP055589896, Washington, DC, United States, ISSN: 0024-9297, DOI: 10.1021/ma00103a005.

International Search Report and the Written Opinion of the International Searching Authority, International Application No. PCT/US2019/022234, pp. 1-16, dated Jun. 4, 2019.

* cited by examiner

SURFACE TREATMENTS FOR WEARABLE DEVICES

BACKGROUND

This disclosure relates to surface treatments for wearable devices for improved sebum resistance.

Wearable devices are available in a variety of shapes and include components, for example, gaskets, seals, and ear tips that are made of soft materials, such as rubber. Components that made of rubber are vulnerable to dimensional changes (swelling) causing delamination or complete dissolution due to exposure to sebum (human skin oils). Some methods for improving resistance to sebum involve increasing the crosslink density in thermoset/vulcanized rubbers. However, increasing the crosslink density changes the bulk properties, such as hardness, tensile strength, elongation, etc. of the rubber. Moreover, increasing the crosslink density may not be suitable for wearable devices where comfort, softness, and elasticity are important. Other methods include adding protective coatings to the surface of rubbers. However, these coatings are deposited using expensive equipment, are time intensive operations, and may wear or abrade over time, rendering them ineffective.

Accordingly, there is a need in the art for inexpensive, efficient, and effective methods for treating surfaces of wearable devices for improved resistance to sebum.

SUMMARY

All examples and features mentioned below can be combined in any technically possible way.

In one aspect, a wearable device includes a body made of an elastic material having a polymeric backbone. A portion of the polymeric backbone is unsaturated. The body has an outer surface that is oxidized on at least one part with at least one functional group where the at least one part of the outer surface is more oleophobic than the body.

Implementations may include one or more of the following. The body may include polynorbornene. The elastic material composing the body may have a first affinity to sebum and the at least one part of the outer surface may have a second affinity to sebum that is less than the first affinity to sebum. The elastic material composing the body may have a first level of surface tack and the at least one part of the outer surface has a second level of surface tack that is less than the first level of surface tack. The at least one functional group consists of a hydroxyl diol, a carboxylic acid, a ketone, and/or an aldehyde. The outer surface can be oxidized uniformly. The elastic material composing the body may include a first level of specular reflection and the at least one part of the outer surface may include a second level of specular reflection that is less than the first level of specular reflection.

In another aspect, a wearable device includes a body made of an elastic material having a polymeric backbone. A portion of the polymeric backbone is unsaturated. The body has a first affinity to sebum. The body also has an outer surface that is oxidized on at least one part. The at least one part of the outer surface has a second affinity to sebum that is less than the first affinity to sebum. In an implementation, the outer surface is oxidized to incorporate at least one functional group consisting of a hydroxyl diol, a carboxylic acid, a ketone, and/or an aldehyde.

In a further aspect, treating a surface of a wearable device to resist sebum includes providing a body made of an elastic material having a polymeric backbone. At least a portion of the polymeric backbone is unsaturated. Treating the surface to resist sebum also includes oxidizing at least one part of an outer surface of the body to incorporate at least one functional group on the polymeric backbone.

Implementations may include one or more of the following. The surface oxidation may include incorporating at least one functional group consisting of a hydroxyl diol, a carboxylic acid, a ketone, and/or an aldehyde on the polymeric backbone. Oxidizing the at least one part of the outer surface of the body may include generating surface oxidation using ultraviolet/ozone treatment. Oxidizing the at least one part of the outer surface of the body may include generating surface oxidation using a solution comprising potassium permanganate and sodium hydroxide. Oxidizing the at least one part of the outer surface of the body may include generating surface oxidation using a solution comprising concentrated sulfuric acid. The solution comprising concentrated sulfuric acid may have a concentration that is less than 50%.

Embodiments including the ultraviolet/ozone treatment may include a first ultraviolet light source emitting energy at two different wavelengths arranged at a first distance from the body. Embodiments may also include a second ultraviolet light source emitting energy at two different wavelengths arranged at a second distance from the body. The first and second distances may be the same or they may be different. In embodiments, the first ultraviolet light source is arranged on top of the body and the second ultraviolet light source is arranged on the bottom of the body, opposite the first ultraviolet light source.

Advantages include reducing the affinity to sebum and the tackiness for elastic materials for improved sebum resistance while eliminating surface contaminants and reducing the surface glare for improved appearance. This allows improved wearability for wearable devices by preventing potential degradation due to prolonged sebum exposure.

Other features and advantages will be apparent from the description and the claims.

DETAILED DESCRIPTION

Wearable devices commonly employ soft materials (e.g., rubber). However, such soft materials tend to have an affinity to sebum, which leads to dimensional changes or complete dissolution. Such soft materials also tend to have a high surface tack, which leads to dust collection and prevents proper placement or presents difficulty in donning certain wearable devices. For some wearable devices, dust collection can also compromise an acoustic seal. The surface treatments described herein extend the long-term wearability of wearable devices by improving sebum resistance. The surface treatments described herein may also reduce tackiness and surface contaminants. The surface treatments simultaneously may reduce surface glare for improved appearance.

This disclosure is based, at least in part, on the realization that sebum is harmful to soft materials and that treating the surfaces of these materials can provide improved sebum resistance. Sebum is a waxy or oily substance that is excreted from sebaceous glands on the body. Chemically, sebum includes a mixture of long aliphatic chains with a polar aprotic end. Natural and synthetic rubbers have an affinity to sebum, leading to dimensional change (swelling) or complete dissolution of the polymer. Polymeric materials can be rendered oleophobic for improved sebum resistance, for example, by oxidation, to generate highly polar hydroxyl, carboxylic acid, ketone, and/or aldehyde functional groups, which resist sebum, on the polymeric backbone. In embodiments, at least a portion of an outer surface of a body made of an elastic polymeric material can be oxidized to generate a functional group which may be selected from a group consisting of a hydroxyl diol, a carboxylic acid, a ketone, or an aldehyde.

The embodiments and implementations disclosed or otherwise envisioned herein can be utilized with any suitable wearable device made of an elastic material, such as rubber, that has already been cured and/or shaped. Examples of suitable wearable devices include Bose QuietControl® headphones (manufactured by Bose Corporation of Framingham, Mass.), noise-blocking earplugs, and hearing aids. However, the disclosure is not limited to these enumerated devices, and thus the disclosure and embodiments disclosed herein can encompass any wearable device.

Figure 1:
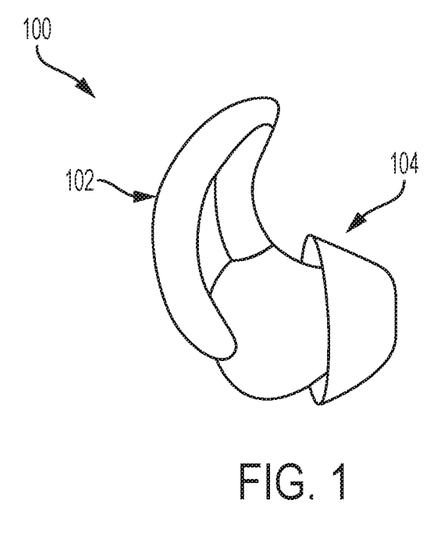
FIG. 1 is an example wearable device.

Referring to FIG. 1, an example wearable device 100, e.g., a Bose StayHear®+ tip (manufactured by Bose Corporation of Framingham, Mass.) is shown. The wearable device 100 in FIG. 1, including a tip base 102 and a tip wing 104, is commonly made of rubber. Depending on the nature of the rubber used, the tip may exhibit an affinity to sebum. As a result, wearable device 100 may exhibit a decrease in mechanical strength after prolonged exposure to sebum. In addition, due to the high tackiness of rubber, the wearable device 100 may attract dirt, which can compromise its acoustic seal and damage tissues of the wearer. Although wearable device 100 can be made of any suitable soft material, one suitable material is compounded polynorbornene (Norsorex® material available from D-NOV GmbH of Vienna, Austria, product number M040822-15). Polynorbornene is a hydrocarbon-based material containing carbon-carbon double bonds in the polymer backbone (unsaturation) as follows:

Polynorbornene exhibits high performance in acoustic, passive attenuation, and comfort metrics and a high glass transition temperature which provides good damping properties and pseudo-custom fit properties. The "unsaturation" refers to the presence of at least one carbon-carbon double bond or carbon-carbon triple bond. Materials suitable for the surface chemistries described herein include any polymeric material containing some amount of unsaturation. The unsaturation may be present as a consequence of the material's formation, or the unsaturation may be introduced by any suitable process.

Figure 2:
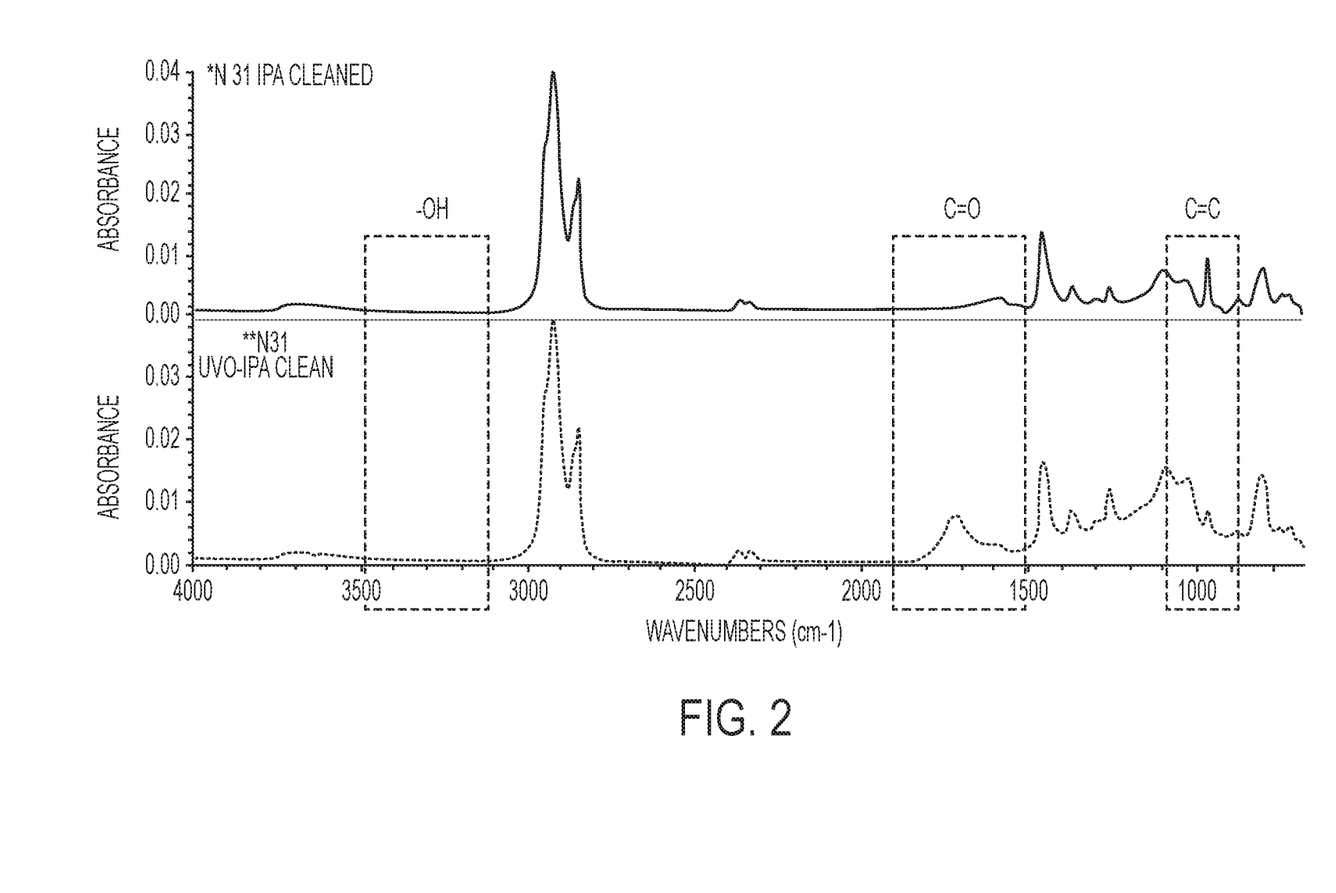
FIG. 2 shows a plot of FT-IR spectra showing surface chemistry effects from ultraviolet/ozone surface treatment.

The methods described herein focus on surface chemistries occurring on the outer sub-micron level of the material so that bulk properties are not impacted. The surface chemistries are analyzed using Fourier-transform infrared spectrophotometry (FT-IR) and x-ray photoelectron spectroscopy (XPS). Through surface oxidation using the methods described herein, drastic improvements in sebum resistance are observed. For example, the IR-spectrum at the top of FIG. 2 shows the unsaturation of the Norsorex® material including intense absorption bands at ~970 $cm^{-1}$ which indicate a number of carbon-carbon double bonds in the backbone. The out-of-plane bending of carbon-carbon double bonds of alkenes typically shows strong signals within the range of 1000-650 $cm^{-1}$. Silverstein, R. M. and Webster, F. X. Spectrometric Identification of Organic Compounds, $6^{th}$ Edition, John Whiley & Son 1998. XPS analysis of neat (untreated) Norsorex® material reveals 98.05% of the material is composed of aliphatic hydrogen-carbon bonds (~285 eV) and 1.95% of the material is composed of C=O bonds (288.7 eV).

The IR-spectrum at the bottom of FIG. 2 on the other hand represents the Norsorex® material after 15 minutes (front and back) of ultraviolet/ozone (UV/O) treatment (further discussed below). The reduced intensity of absorption bands at ~970 $cm^{-1}$ corresponds to the conversion of the carbon-carbon double bonds and the new bands that emerge in the spectrum at 1700 $cm^{-1}$ and 3300 $cm^{-1}$ correspond to the oscillations of carbonyl and alcohol groups introduced into the polymer due to the UV/O treatment. The broad signals of hydroxyl groups of alcohols are typically between 3550-3200 $cm^{-1}$, the signals of carbon-oxygen bonds of ketones are typically between 1715-1600 $cm^{-1}$, and the signals of carbon-oxygen bonds of aldehydes and carboxylic acids are typically between 1740-1702 $cm^{-1}$ and at ~1760 $cm^{-1}$, respectively. Silverstein, R. M. and Webster, F. X. Spectrometric Identification of Organic Compounds, $6^{th}$ Edition, John Whiley & Son 1998. As shown in FIG. 2, UV/O treatment alters the surface chemistry of the Norsorex® material such that hydroxyl and carbonyl functional groups are incorporated on the backbone of the polymer. XPS analysis of the Norsorex® material treated with UV/O reveals 96.46% of the material is composed of aliphatic hydrogen-carbon bonds (versus 98.05% for the untreated Norsorex® material) and 1.62% of the material is composed of C=O bonds (versus 1.95% for the untreated Norsorex® material). In addition, XPS analysis of the Norsorex® material treated with UV/O reveals 1.92% of the material consists of hydroxyl groups (—OH) (~286.4 eV), whereas the untreated Norsorex® material contained no hydroxyl groups. The treated modified surface exhibits an improved resistance to sebum, a reduced tackiness, and a reduced surface glare (or specular reflectance) as a result of the treatment.

Figure 3:
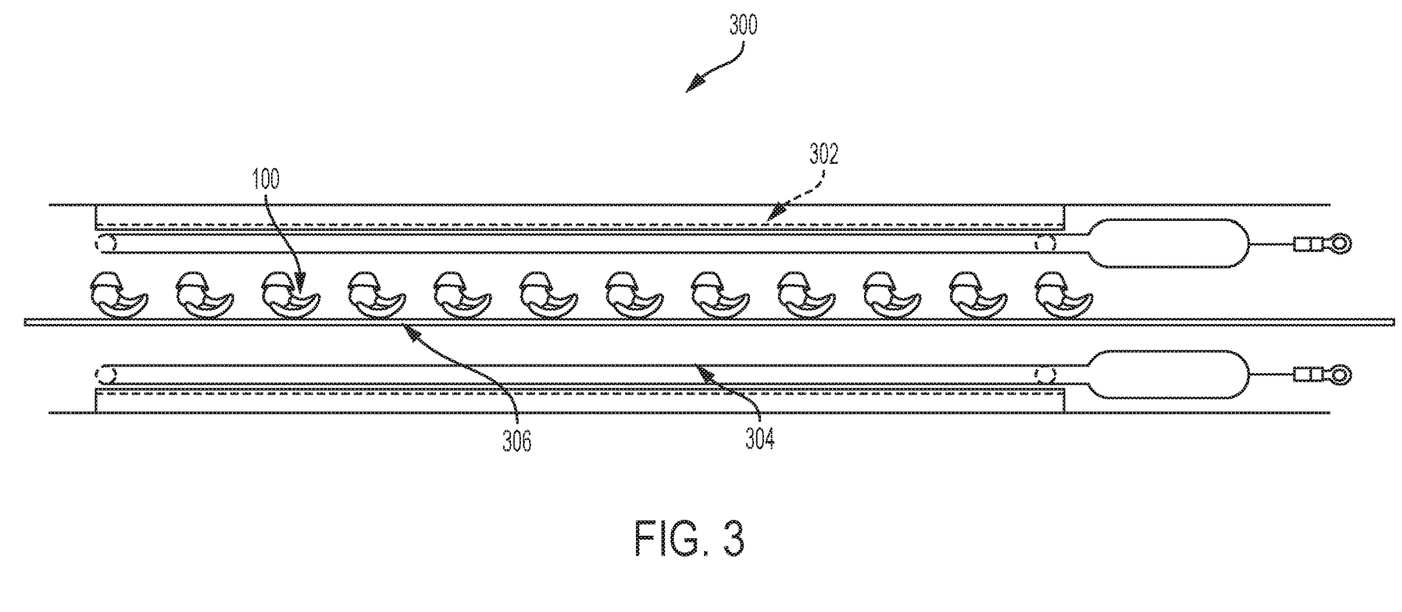
FIG. 3 is a schematic representation of an ultraviolet/ozone chamber.

The UV/O treatment, which creates the surface oxidation, can be conducted in any suitable gas chamber including oxygen, for example, a customized chamber which can be manufactured by Jelight Company, Inc. of Irvine, Calif. A schematic representation of an example UV/O chamber is shown in FIG. 3. The UV/O chamber 300 includes a top UV lamp station 302 and a bottom UV lamp station 304. Each lamp within each UV lamp station emits multiple wavelengths. The UV/O chamber 300 can be filled with atmospheric air or oxygen. Each of the top and bottom UV lamp stations 302 and 304 can include multiple UV lights. For example, the atmospheric oxygen in the chamber 300 can be irradiated with UV rays having a wavelength of 184.9 nm to form ozone ($O_3$). Ozone decomposes through irradiation with UV rays having a wavelength of 253.7 nm. Atomic oxygen is generated during these processes. The UV/O chamber 300 can also include a fan or air pump to move the oxygen through the chamber. Although the embodiments and implementations disclosed or otherwise envisioned herein include UV lamps, any suitable source of light may be employed, such as, mercury lights, electric arcs, sunlight, lasers tuned to a suitable wavelength, flash tubes, etc., instead.

Although commercially available UV/O chambers have lamps only on the top (for example, to clean silicon wafers), in contrast, one or more wearable devices 100 can be arranged between the top and bottom UV lamp stations 302 and 304 of the UV/O chamber 300 as shown in FIG. 3. The one or more wearable devices can be placed on top of a support member 306 arranged between the top and bottom UV lamp stations 302 and 304. The support member 306 can be made of any suitable synthetic material that is transparent to UV or any other suitable alternative. The transparent support member 306 allows the UV rays from the lamps to reach 360 degrees around each wearable device 100, reducing cycle time and labor in a production environment. Although FIG. 3 depicts each wearable device held in place without any additional components, such additional components, for example, pins, or any suitable alternative can be included in alternate embodiments. The wearable devices are arranged at a distance of less than 5 mm from the top and bottom UV lamp stations 302 and 304, preferably less than 2 mm, and preferably at a distance between 1-2 mm. The wearable devices can be arranged along a plane that is equidistant between the top and bottom UV lamp stations 302 and 304.

To achieve an improved resistance to sebum and/or a reduced tackiness, the wearable devices are exposed to the UV/O treatment for at least 4 minutes, and preferably at least 5-10 minutes at ambient temperature. Prolonged treating time and elevated temperature show increased surface chemistry change. Effective surface oxidation using the UV/O treatment is observed at 50 degrees Celsius, and even further surface oxidation is observed at 100 degrees Celsius. There is minimal impact on the surface chemistry from using different oxygen flow rates.

While the surface oxidation can be achieved using UV/O treatment without any solutions, the surface oxidation can also be achieved using a suitable solution of potassium permanganate and sodium hydroxide ($KMnO_4$/NaOH), a sulfuric acid, or any other suitable oxidizing agent. Like the UV/O treatment, potassium permanganate surface treatment leads to improvements in mechanical properties after sebum exposure. For example, wearable devices 100 that are exposed to only one minute of potassium permanganate surface treatment and three days of sebum exposure thereafter show significant degradation. However, increasing the duration of potassium permanganate treatment from one minute to five minutes yields less degradation of the wearable devices 100 after the three days of sebum exposure. Increasing the duration of potassium permanganate treatment from five to ten minutes yields even less degradation after the three days of sebum exposure. The potassium permanganate surface treatment can involve immersing the wearable devices 100 in a high temperature potassium permanganate bath, preferably around 70 degrees Celsius. The three day sebum exposure can involve immersing the wearable devices 100 in a sebum bath for three days at 85 degrees Celsius. Critically, the wearable devices 100 having five minutes of potassium permanganate surface treatment can withstand the three days of sebum exposure and the devices having at least ten minutes of potassium permanganate surface treatment, preferably at least fifteen minutes of potassium permanganate surface treatment, and, more preferably at least thirty minutes of potassium permanganate surface treatment, can withstand at least five days of the sebum exposure.

Figure 4:
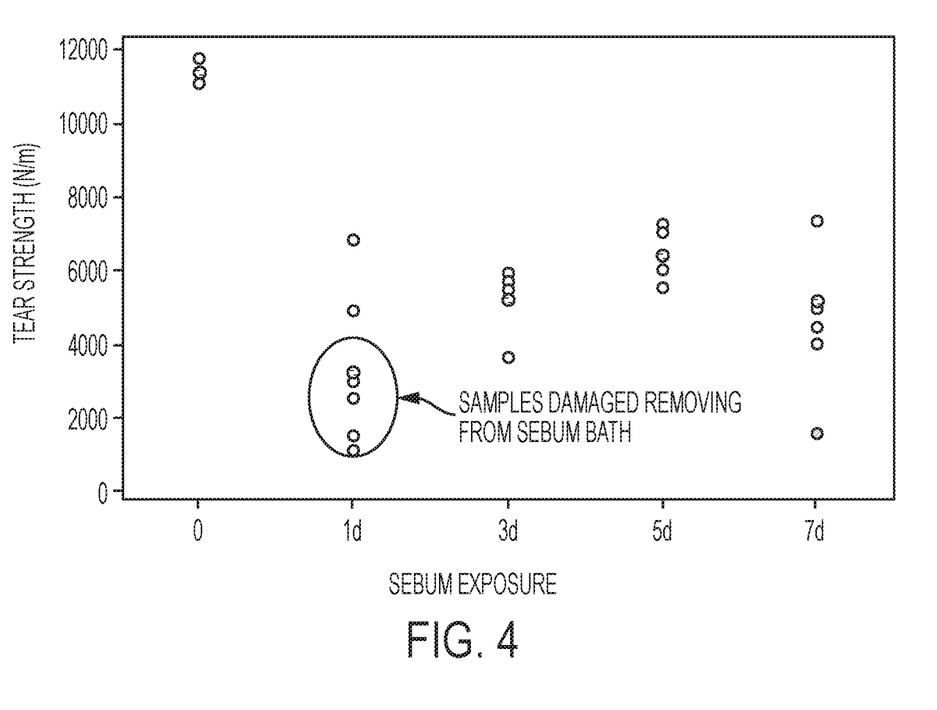
FIG. 4 shows a graph illustrating exemplary tear strength effects of potassium permanganate surface treatment.

Similarly, exposing the wearable devices 100 to potassium permanganate treatment at room temperature for one hour leads to improved mechanical properties post sebum testing. FIG. 4 shows a graph of the effect of potassium permanganate surface treatment on tear strength of example wearable devices 100. The tear strength represents the ability of a material to resist tearing. Tear strength for rubber can be quantified by measuring the force required to tear a 1 mm thick specimen under the conditions outlined in ASTM D-624. Suitable testing systems are available from Instron® of Norwood, Mass. The wearable devices 100 that are treated with potassium permanganate at room temperature for one hour and having no sebum exposure have the highest tear strength. In contrast, untreated wearable devices dissolve after one day of sebum exposure. However, the wearable devices 100 that are treated with potassium permanganate at room temperature for one hour still have an acceptable tear strength for the application, albeit a reduced tear strength, after one day of sebum exposure. Thus, the potassium permanganate treatment prevents the wearable devices from dissolving due to sebum exposure, thereby improving the mechanical properties. XPS analysis of the Norsorex® material treated with potassium permanganate and sodium hydroxide reveals 94.02% of the material is composed of aliphatic hydrogen-carbon bonds (versus 98.05% for the neat Norsorex® material) and 3.23% of the material is composed of C=O bonds (versus 1.95% for the neat Norsorex® material). In addition, XPS analysis of the Norsorex® material treated with potassium permanganate and sodium hydroxide reveals 2.75% of the material consists of hydroxyl groups (—OH), whereas the untreated Norsorex® material contained no hydroxyl groups.

Figure 5:
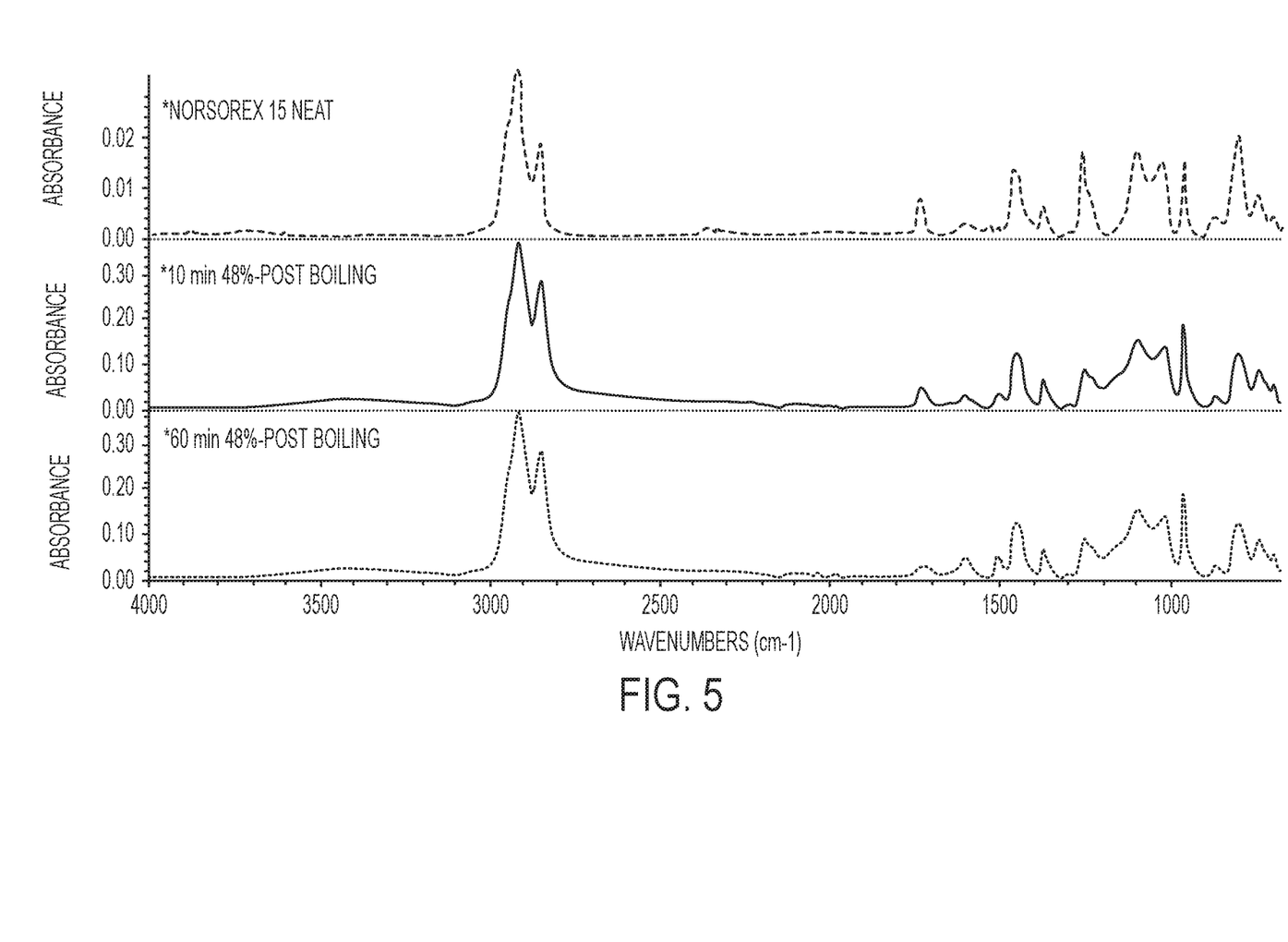
FIG. 5 shows a plot of FT-IR spectra showing surface chemistry effects from sulfuric acid surface treatment.

Exposing the wearable devices 100 to sulfuric acid treatment also leads to improved mechanical properties. The IR-spectrum at the top of FIG. 5 represents the untreated (neat) Norsorex® material. The IR-spectrum in the middle of FIG. 5 represents the Norsorex® material after 10 minutes of surface treatment with 48% concentrated sulfuric acid and a post water boiling process. The increased intensity of the broad absorption bands between 3550-3200 $cm^{-1}$ indicates the incorporation of hydroxyl groups. The IR-spectrum at the bottom of FIG. 5 represents the Norsorex® material after 60 minutes of surface treatment with 48% concentrated sulfuric acid and a post water boiling process. Similarly, there is an increased intensity of broad absorption bands between 3550-3200 $cm^{-1}$. It is believed that the concentrated sulfuric acid breaks up the carbon-carbon double bonds and the post water boiling process converts the previously added sulfonate group into a hydroxyl group. As a result of the added hydroxyl group, the treated surface exhibits a 3× improvement in sebum resistance.

The following examples are provided as further illustrations and are not to be construed as limiting inasmuch as variations and modifications within the scope of the present disclosure will be readily apparent.

EXAMPLE 1

Figure 6:
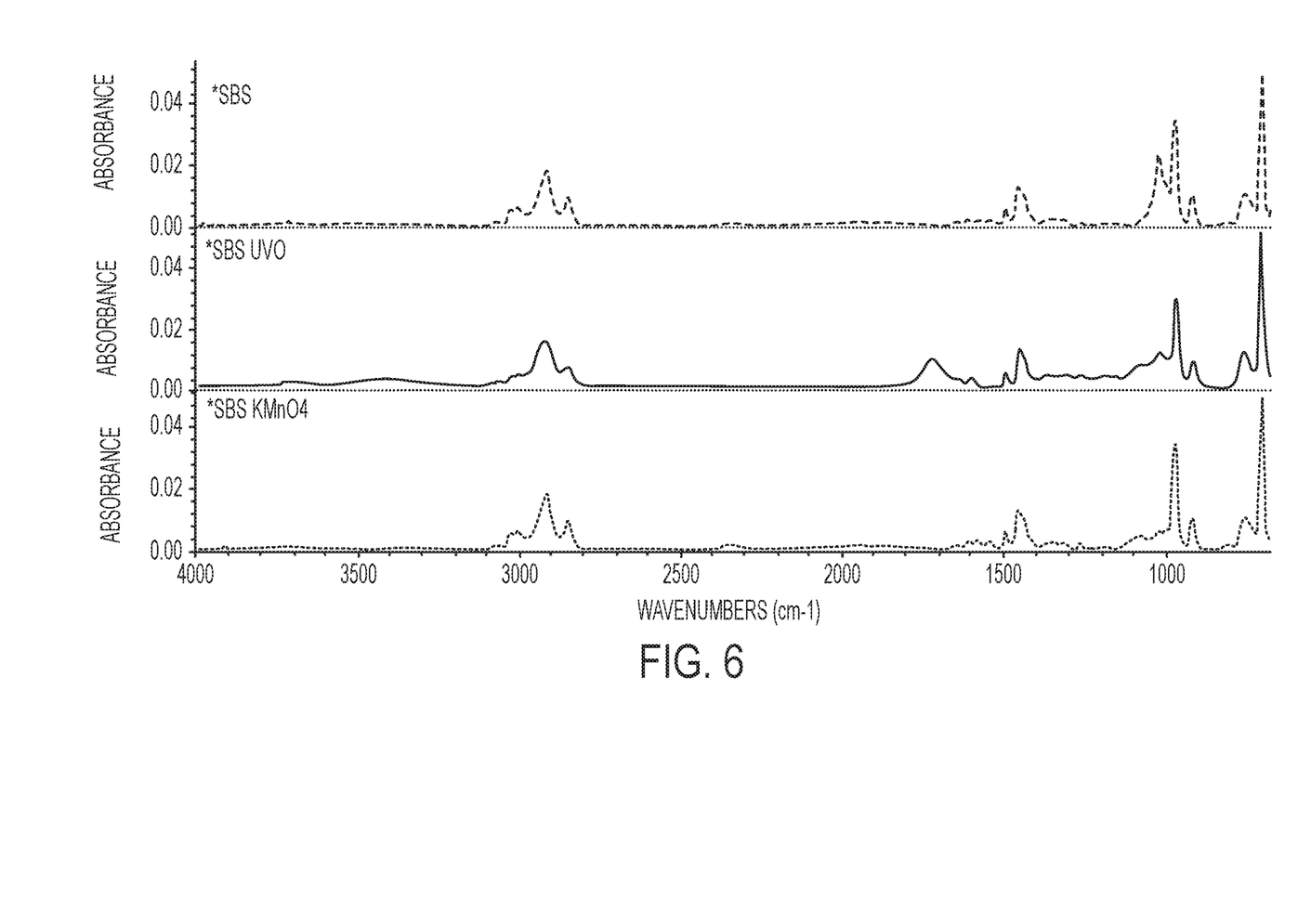
FIG. 6 shows a plot of FT-IR spectra showing comparative surface chemistry effects from ultraviolet/ozone and potassium permanganate surface treatments.

The UV/O surface treatment described herein is also effective on styrene-butadiene polymers (SB, SBS). For example, neat styrene-butadiene polymers (SB, SBS) dissolve in sebum after a few hours. However, SBS with UV/O treatment becomes soft after 1 day of sebum exposure but can maintain some mechanical strength. FIG. 6 shows absorbance spectra for neat SBS, SBS treated with UV/O, and SBS treated with $KMnO_4$/NaOH. The IR-spectrum in the middle of FIG. 6 shows increased intensity of absorption bands at ~3300 $cm^{-1}$ and ~1700 $cm^{-1}$ indicating the incorporation of hydroxyl and carbonyl functional groups due to the UV/O treatment. In contrast, the IR-spectrum at the top of FIG. 6 showing the neat SBS lacks these absorption bands. The IR-spectrum in the middle also shows a reduced intensity of absorption bands at ~970 $cm^{-1}$ corresponding to a decrease in the C=C double bonds. These same changes are not visible in the IR-spectrum at the bottom of FIG. 6 showing the SBS treated with $KMnO_4$/NaOH.

EXAMPLE 2

Figure 7:
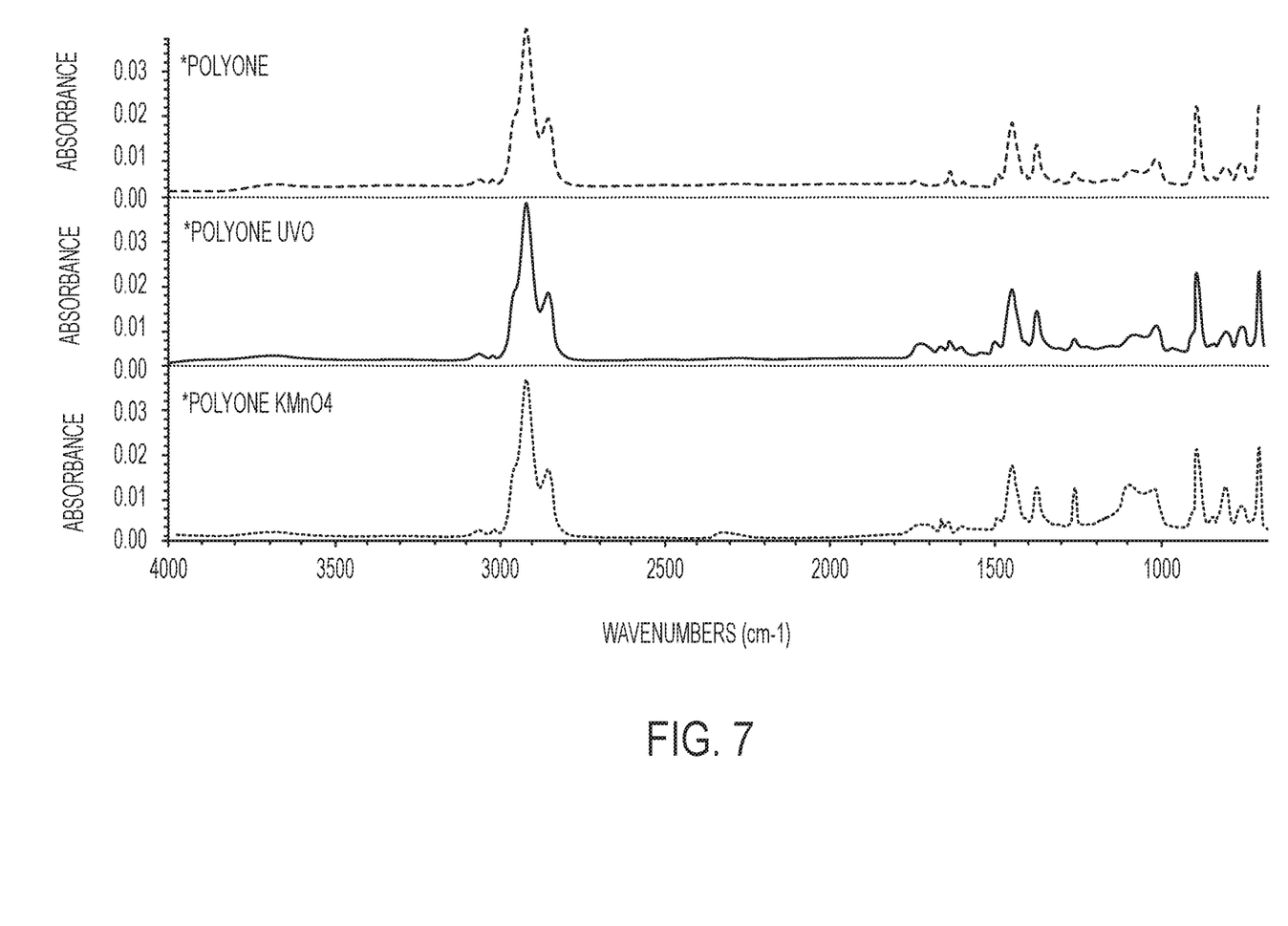
FIG. 7 shows a plot of FT-IR spectra showing comparative surface chemistry effects from ultraviolet/ozone and potassium permanganate surface treatments.

Both UV/O and $KMnO_4$/NaOH surface treatments described herein are also effective on a styrenic-based thermoplastic elastomer (TPE) available from PolyOne of Avon Lake, Ohio, product number 481-047A9. The PolyOne® TPE has at least some unsaturation, preferably at least 5% unsaturation. FIG. 7 shows absorbance spectra for the styrenic-based thermoplastic elastomer, neat, with UV/O treatment, and with $KMnO_4$/NaOH treatment. While neat styrenic-based thermoplastic elastomer becomes very soft and breaks easily after 2 days in sebum, samples that are treated with UV/O and $KMnO_4$/NaOH do not become very soft or break easily until 5-6 days in sebum. In addition, the styrenic-based thermoplastic elastomer devices treated with UV/O and $KMnO_4$/NaOH show a reduced amount of sebum uptake. As shown in FIG. 7, the bottom two IR-spectra show increased intensity of absorption bands at ~1700 $cm^{-1}$ indicating the incorporation of C=O functional groups. In addition, the bottom two IR-spectra show a reduced intensity of absorption bands at ~970 $cm^{-1}$ corresponding to a decrease in the C=C double bonds.

Figure 8:
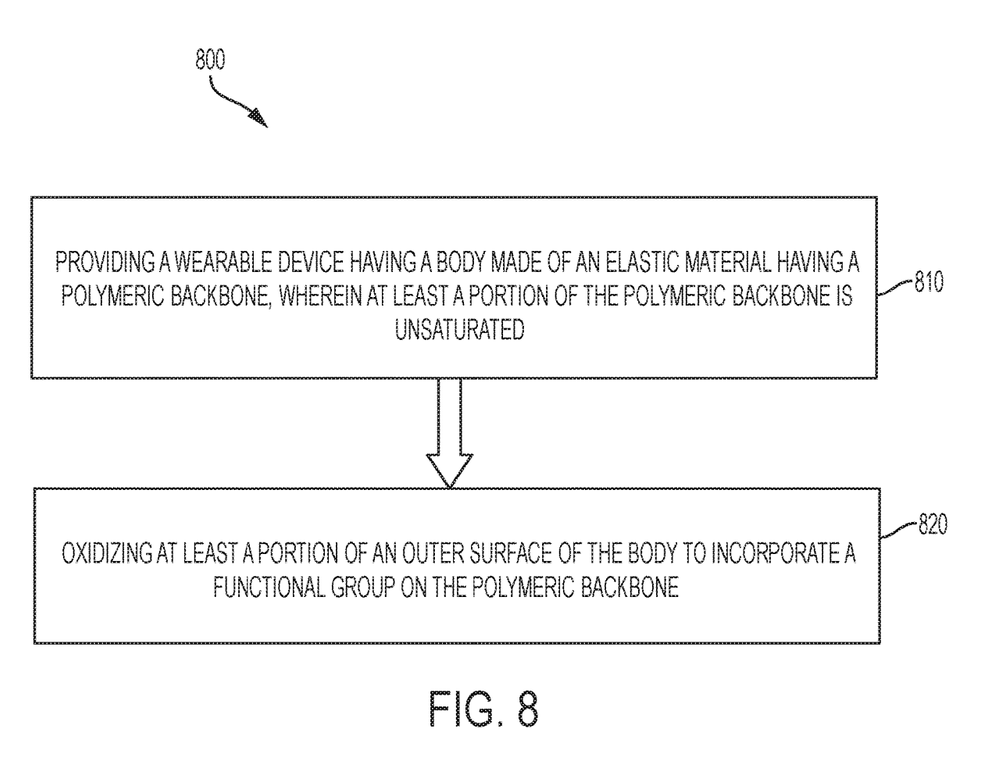
FIG. 8 is a flowchart of an example method of treating a surface of a wearable device to resist sebum.

FIG. 8 is a flowchart of an example method of treating a surface of a wearable device to resist sebum. At step 810, a wearable device is provided, the wearable device having a body made of an elastic polymeric material, wherein a portion of the elastic polymeric backbone is unsaturated. The wearable device can be any device described or otherwise envisioned herein. For example, implementations of the body may include vulcanized polynorbornene, styrene-butadiene polymers, and styrenic-based thermoplastic elastomers.

At step 820, at least one part of an outer surface of the body is oxidized such that the at least one part is more oleophobic than the body. The surface oxidation may generate one or more functional groups on the elastic polymeric backbone such as hydroxyls, carboxylic acids, ketones, and/or aldehydes.

The surface treatments described herein provide beneficial material properties at the outermost surfaces of the wearable device without interfering with the beneficial bulk properties of the wearable device. Because the surface treatments do not involve two or more separate materials having different strengths or other differences, issues with coating longevity, abrasion resistance, adhesion, coating thickness/uniformity, cracking, defects, and delamination are avoided. Moreover, issues pertaining to the added step of applying protective surface coatings are avoided.

Other implementations are within the scope of the following claims and other claims to which the applicant may be entitled.

What is claimed is:

1. A wearable device, comprising:
a body comprising an elastic material having a polymeric backbone, wherein a portion of the polymeric backbone is unsaturated,
the body having an outer surface that is oxidized on at least one part with at least one functional group, wherein the at least one part of the outer surface is more oleophobic than the body and the at least one part of the outer surface is configured to provide an acoustic seal and come into contact with sebum.

2. The wearable device of claim 1, wherein the body comprises polynorbornene.

3. The wearable device of claim 1, wherein the elastic material composing the body has a first affinity to sebum.

4. The wearable device of claim 3, wherein the at least one part of the outer surface has a second affinity to sebum that is less than the first affinity to sebum.

5. The wearable device of claim 1, wherein the elastic material composing the body has a first level of surface tack.

6. The wearable device of claim 5, wherein the at least one part of the outer surface has a second level of surface tack that is less than the first level of surface tack.

7. The wearable device of claim 1, wherein the at least one functional group consists of a hydroxyl diol, a carboxylic acid, a ketone, and/or an aldehyde.

8. The wearable device of claim 1, wherein the outer surface of the body is oxidized uniformly.

9. The wearable device of claim 1, wherein the elastic material composing the body has a first level of specular reflection.

10. The wearable device of claim 9, wherein the at least one part of the outer surface has a second level of specular reflection that is less than the first level of specular reflection.

11. A wearable device, comprising:
a body comprising an elastic material having a polymeric backbone, wherein a portion of the polymeric backbone is unsaturated, the body having a first affinity to sebum,
the body also having an outer surface that is oxidized on at least one part, the at least one part of the outer surface having a second affinity to sebum that is less than the first affinity to sebum and the at least one part of the outer surface is configured to provide an acoustic seal and come into contact with sebum.

12. The wearable device of claim 11, wherein the outer surface is oxidized to incorporate at least one functional group consisting of a hydroxyl diol, a carboxylic acid, a ketone, and/or an aldehyde.

13. A method of treating a surface of a wearable device to resist sebum, the method comprising:
providing a body comprising an elastic material having a polymeric backbone, wherein a portion of the polymeric backbone is unsaturated, the body having an outer surface;
oxidizing at least one part of the outer surface to incorporate at least one functional group on the polymeric backbone; and configuring the at least one part of the outer surface to provide an acoustic seal.

14. The method of claim 13, wherein the at least one functional group consists of a hydroxyl diol, a carboxylic acid, a ketone, and/or an aldehyde on the polymeric backbone.

15. The method of claim 13, wherein oxidizing the at least one part of the outer surface of the body comprises generating surface oxidation using ultraviolet/ozone treatment.

16. The method of claim 15, wherein the ultraviolet/ozone treatment comprises a first ultraviolet light source emitting energy at two different wavelengths, and oxidizing comprises arranging the first ultraviolet light source at a first distance from the body to reduce cycle time and labor in a production environment.

17. The method of claim 16, wherein the ultraviolet/ozone treatment comprises a second ultraviolet light source emitting energy at two different wavelengths, and oxidizing comprises arranging the second ultraviolet light source at a second distance from the body.

18. The method of claim 13, wherein oxidizing the at least one part of the outer surface of the body comprises generating surface oxidation using a solution comprising potassium permanganate and sodium hydroxide.

19. The method of claim 13, wherein oxidizing the at least one part of the outer surface of the body comprises generating surface oxidation using a solution comprising concentrated sulfuric acid.

20. The method of claim 19, wherein the solution comprises a concentration that is less than 50%.

\* \* \* \* \*